United States Patent Office 3,464,835
Patented Sept. 2, 1969

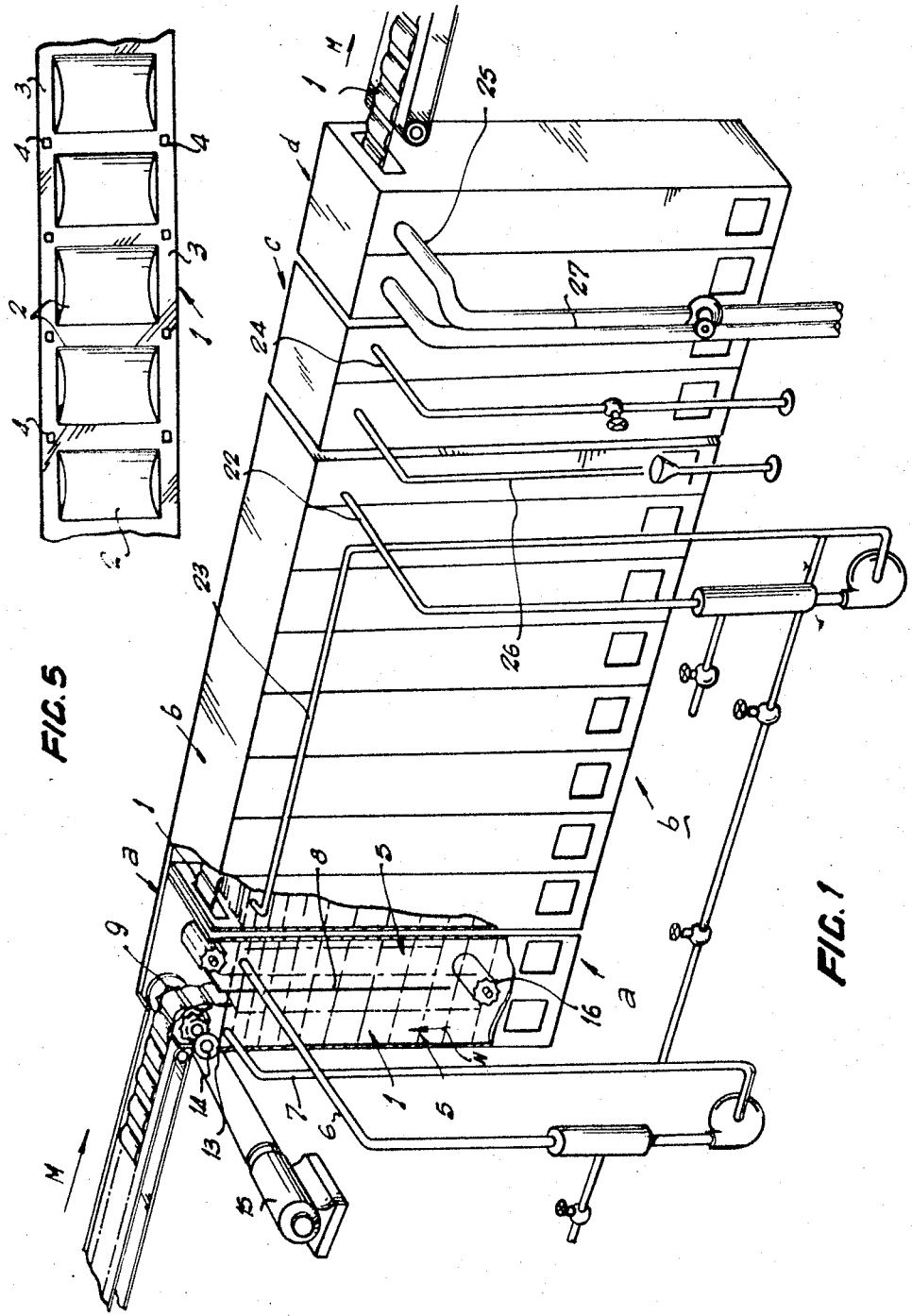

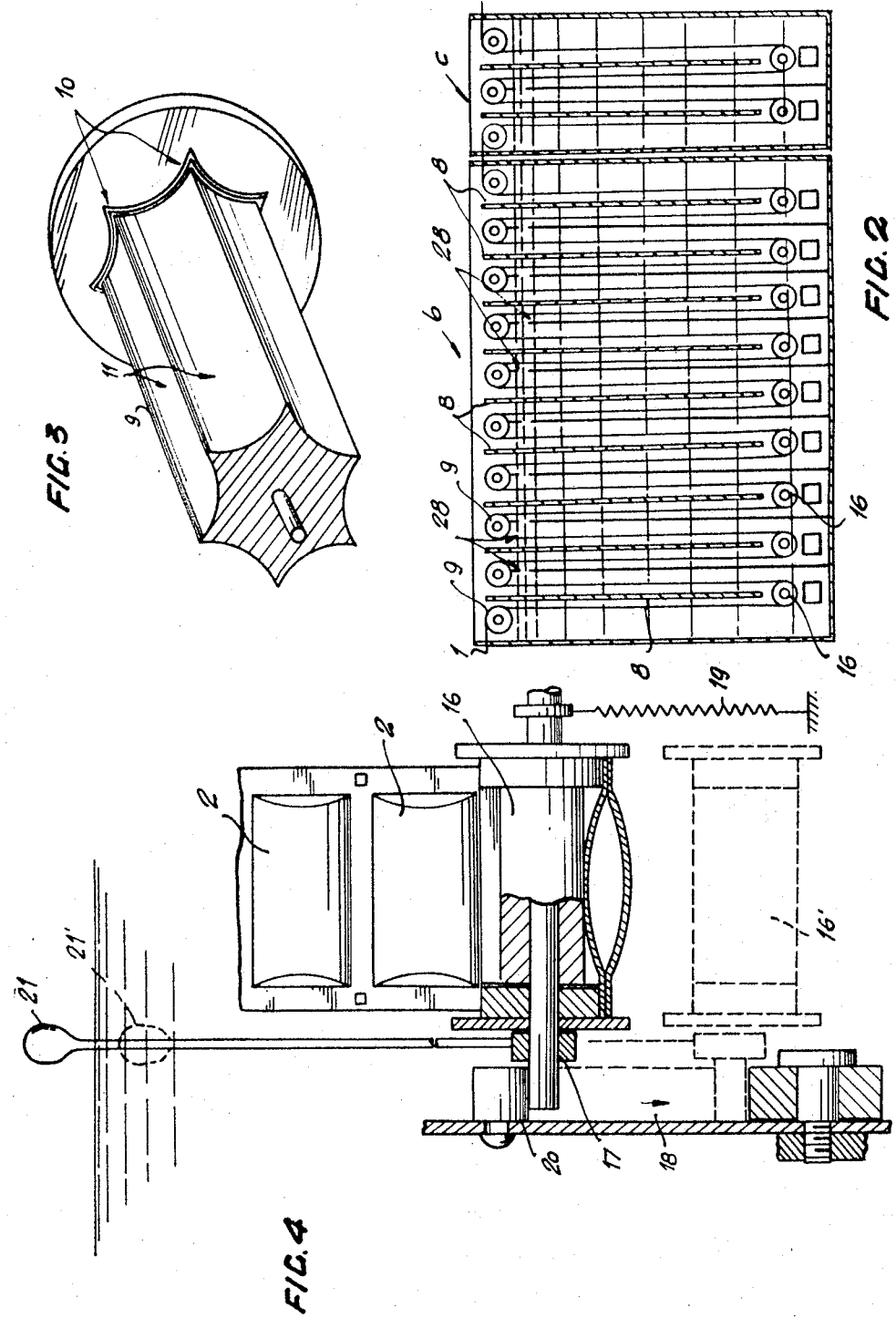

3,464,835
PROCESS FOR PASTEURIZING LIQUID PRODUCTS IN A CONTINUOUS LINE OF PLASTIC SACHETS
Peregrino Mario del Pilar Castro, Marconi and Blanco Encalada, San Isidro, Buenos Aires, Argentina
Continuation-in-part of application Ser. No. 391,580, Aug. 24, 1964. This application May 29, 1968, Ser. No. 733,055
Int. Cl. A23c 9/00; B65b 55/00
U.S. Cl. 99—212                              9 Claims

ABSTRACT OF THE DISCLOSURE

A process for pasteurizing a liquid product in which the liquid product is partially filled in a succession of sachets of flexible material in an uninterrupted line and the line is passed along an undulating path, under traction, in successive treatment zones wherein the liquid product is pasteurized.

Cross-related application

This application is a continuation-in-part of my earlier application Ser. No. 391,580 (now abandoned) filed Aug. 24, 1964.

Brief summary of the invention

This invention relates to a novel process for pasteurizing liquid products and particularly to liquid products contained in sachets of flexible sheet material.

The pasteurization of liquid in bulk offers no substantial problems. The usual method is to cause the liquid to circulate through heat exchangers to raise the temperature of the liquid to the required temperature during the period of time necessary to complete the pasteurization process.

The method is different when the liquid to be pasteurized is enclosed in a container. Also, the conditions will depend on whether the containers are permanently closed or have removable lids or caps. In the first case, for example with canned liquid, the process is relatively simple, since the sealed containers will generally satisfactorily withstand the pressures generated therein during the pasteurizing process.

On the contrary, when operating with glass containers, for example, those requiring corks, crown caps, or the like, which afford a good closure under normal conditions, these closures are not sufficiently effective to resist the pressures generated during the pasteurization process or when subjected to different temperatures.

Moreover, such containers are not tamper-proof, particularly conventional milk bottles the closures of which can be easily removed and replaced.

In order to remove the above drawbacks, use has been made of non-rigid enclosures, for example paraffin cardboard having an interior layer of flexible sheet material such as polyethylene. These enclosures, extensively used as milk containers, are heat-sealed after being filled with the previously pasteurized product and, being tamper-proof, have been widely accepted and adopted. Notwithstanding the aforesaid advantages, however, these containers present the danger of contamination, since the enclosures may contain germs inasmuch as they do not take part in the pasteurizing process. Furthermore, the filling operation is carried out in contact with ambient air and some of the ambient air is included in the containers with the danger of inclusion of undesired and contaminating microorganisms. Also, there is no guarantee as to the sterility of the elements of the filling machine placed in direct contact with the pasteurized product.

It is known to employ flexible sheet material derived from synthetic resins, commonly designated "plastic material" to enclose the liquid. Notwithstanding the particular advantages of this material, there is no known suitable process for pasteurizing liquid enclosed in sachets. Hence, there is limited usage of pasteurized liquid enclosed in sachets of plastic material.

An object of the invention is to provide a novel process for pasteurizing liquid products contained in sachets, and thereby make it possible to pasteurize a product enclosed in a container which is airtight, tamper-proof, inexpensive, and of a strength and disposition such that it can be filled and sealed without any ambient air being included with the liquid.

Before carrying out the novel process of this invention, it is necessary that sachets of flexible sheet material be previously filled with liquid to the exclusion of any ambient air and then heat-sealed. The filling process can be carried out by the process disclosed in my earlier U.S. Patent 3,339,336.

It has been discovered that a novel pasteurization process can be carried out on filled and sealed sachets as produced by the process described in the aforesaid patent. Of particular significance is the fact that the process of the present invention has been promulgated in reliance of the feature that the liquid only partially fills the sachets in said patent. More particularly, the process of the present invention comprises forming a succession of sachets of flexible sheet material in an uninterrupted line such that each sachet has a sealed chamber containing liquid in an amount only partially filling the chamber, the line of sachets then being passed along an undulating path of travel in successive treatment zones by exerting traction on the line of sachets, a treatment liquid being circulated in said zones to cause the liquid in the sachets to undergo pasteurization as the sachets pass through said zones.

It will be understood from the above that the great advantage of the process is that it provides for a continuous, rapid and inexpensive pasteurization of an effectiveness never attained heretofore in enclosed foodstuffs since it insures the total destruction of the pathogenic flora and the prevalance of the banal acidogenous flora as in the particular case of milk, both in the container and in the contents.

Also, the absence of ambient air in the sachets will minimize the risk of undesired contamination or fermentation in the period between the enclosing of the product and the consumption thereof.

It should also be noted that the units obtained by separation of the sachets one from the other are airtight, tamper-proof, light in weight, of low cost and not-reusable. This latter feature will avoid the cumbersome and expensive task of returning the containers to the filling plant, as is the case with glass bottles.

As regards the quality of the pasteurized product, it may be said that with the process of this invention the product will not suffer the undesired variations caused by heat in the same measure as with the conventional pasteurizing methods. During the application of the various thermal steps in the treatment zones, whether heating or cooling, the travel of the line of sachets will stir the contents thereof and this will result in a full homogenization of the temperature. This will avoid heating of the peripheral zones to an excess temperature while the interior zones are insufficiently treated. Thermo-sedimentation problems are eliminated and the difficulties arising, for example with the fat solids in the case of milk, by the difference in density, are eliminated.

In further accordance with the process of the invention, the tension in the line of sachets is utilized to determine a break in the line and produce a signal which indicates such break. Specifically, the elimination of the tension in the line of sachets at the point of the break is utilized to generate the aforesaid signal.

Brief description of the drawing

FIGURE 1 is a perspective view of a pasteurizing machine according to the present invention, with portions broken away to show interior details thereof;

FIGURE 2 is a diagrammatic and fragmentary longitudinal sectional elevation of some of the tanks comprising the machine;

FIGURE 3 is a cross-sectional perspective view of one of the driving pulleys;

FIGURE 4 is an elevation view partly in section of one of the idle pulleys, showing in full lines the working position thereof when the line of sachets moves normally, and in dash-lines the position of the pulley when the line of sachets is broken; and FIGURE 5 is a fragmentary view of a line of sachets filled with liquid to be pasteurized.

The same reference characters are used to indicate like or corresponding parts or elements throughout the drawings.

Detailed description

Bearing in mind what has already been explained above in connection with the process, and with reference to the drawings, the pasteurizing machine of the present invention is intended to act in combination with a mechanism for supplying thereto a row or line 1 of sachets 2, (FIG. 5) connected together and having side strips 3 formed with spaced perforations 4. The sachet supplying device and also the means for filling and sealing the sachets 2 have not been illustrated and they may be constructed as shown in my prior patent U.S. Pat 3,339,336. An important consideration of the process of the present invention is that the sealed sachets 2 be only partially filled with liquid whereby there is formed an expansion chamber for the contents of the sachet in the thermal treatment in which the contents are pasteurized. Moreover, the liquid in the sachet will be able to readily flow in the sachet during the treatment, the significance of which will be apparent later.

As shown in FIGS 1 and 2, the pasteurizing machine comprises a plurality of elongated tanks 5 associated to form four sections a–b–c–d which are independent as regards the liquid contained therein. The number of tanks 5 in each of the four sections may be varied at will, according to the characteristics of the product to be pasteurized and to the speed which it is desired to conduct the process. Furthermore, while four sections have been illustrated by way of example, it should be understood that the number of tank sections may be more or less than four.

Liquid at a given temperature is circulated in each tank section, and each section is provided with separate liquid supply and discharge means.

The pre-heating section a is provided with a liquid supply pipe 6 and a discharge tube 7, with their respective openings in the upper portion of the tanks 5, the latter being divided each by a partition 8.

The outer side wall of the tank 5 is formed with a window constituting an access opening for the admission of the line 1 formed by the sachets 2 containing liquid to be pasteurized. Close to the aforesaid window there is arranged a first driving pulley or roller 9 (FIGS. 1 and 3) each end of which is provided with teeth 10 adapted to engage the perforations 4 in the side strips 3 of the line 1. Also, the driving pulleys 9 are formed with longitudinal grooves 11 for receiving the convex, pouch-like regions of the sachets 2, as shown.

By means of a smaller pulley 13 fixed to the shaft 14 of the driving roller or pulley 9, the latter is connected with an electric motor 15, or the like, for the drive thereof.

The lower ends of the partitions 8 terminate at a distance from the bottom of the tanks 5. Below each of the partitions 8 there is provided an idle pulley 16 (FIGS. 1 and 4) which is suspended by the sachet line 1 but arranged so that the shaft 17 thereof is freely housed in a slide 18 allowing a considerable vertical movement thereof. Also, the ends of the shafts 17 are connected to means such as springs 19 or the like, urging the shafts downwards as shown in dash-lines in FIG. 4.

The pulley shaft 17 also has associated therewith a small bushing 20 having connected thereto means for supporting an indicator 21 emerging from the liquid filling the tank.

The position of the driving and idle pulleys 9 and 16, respectively, in the remaining tanks is similar to that described above, and FIG. 2 illustrates the case of the tank sections b and c, showing the arrangement of the partitions 8 and the manner in which the line 1 of sachets is positioned as it follows an undulating upward and downward path. Because of this undulating path, the liquid, which only partially fills the sachets, will be continuously circulated in the sachets whereby uniform treatment conditions will prevail.

FIG. 1 also shows that the tank section b is provided with a liquid supply pipe 22 and a discharge tube 23. The same is true of the tank sections c and d in which the supply pipes 24 and 25 and discharge pipes 26 and 27 are respectively arranged in a similar manner and serve the same purpose of causing the liquid to circulate in a direction opposite to the direction of travel of the sachet line 1. Communication between the tanks in each section is obtained below the upper end of the partitions 8 by means of openings 28 (FIG. 2) provided in the walls of the tanks 5 of the same section, at the upper portion thereof and somewhat below the level of the shafts of the driving pulleys 9.

The operation of the pasteurizing machine of this invention is as follows:

The pasteurizing conditions are obtained by circulating water at the required temperature through each section of tanks.

The line 1 of sachets 2 is then caused to enter the pasteurizing equipment by the driving action of the driving pulleys 9 the teeth 10 of which engage the perforations 4 in the lateral strips 3 of the line of sachets.

With the aid of the idle pulleys 16, the sachet line 1 will be passed from the pre-heating tanks in section a to the tanks in section b wherein the circulating liquid is at pasteurizing temperature. It may be seen in FIGS. 1 and 2 that the number of tanks in section b is greater than in the rest of the sections, since the liquid to be pasteurized should remain submerged in the pasteurizing liquid for a longer period of time. The number of tanks depends on the speed of travel of the line of sachets. From the section b, the line of sachets pass to the tanks of the pre-cooling section c and from the latter to the cooling section d. Also in these sections the number of tanks may be varied, but inasmuch as the pre-cooling and cooling process is shorter than the pasteurizing process proper, the number of tanks will always be smaller than in the section b.

During the pasteurizing process the travel of the line 1 is continuous and in the direction indicated by the arrows M in FIG. 1. Simultaneously, the pasteurizing liquid in the tanks corresponding to the section b, as well as in the remaining pre-heating section a, pre-cooling section c and cooling section d will circulate in the direction of the arrows N, FIG. 1, i.e., in a direction opposite to the direction of travel of the sachet line 1. In this manner, the change of temperature will be gradual. Any difficulty in the travel of the sachet line 1 could result in a breakage thereof and, in view of the particular shape of the tanks 5, the joining together of the broken ends of the line is not simple. In order to solve this possible problem as rapidly and easily as possible, the machine is provided with indicator mechanisms which will instantly indicate the location of the failure and automatically stop the operation of the mechanism driving the line of sachets.

One embodiment of a device for indicating a failure and for stopping the operation of the machine is shown in FIG. 4. The embodiment comprises a signal member 21 coupled to the shaft 17 of an idle pulley 16. Said shaft 17 is urged by spring 19 towards the bottom of the slide 18 in which the shaft is mounted.

When the sachet line 1 is taut and the operation of the machine is normal, the idle pulley 16 is supported by the sachet line and the shaft 17 thereof will engage the uppermost portion of the slide 18, the spring 19 being stretched. Also, the signal member 21 will project out of the liquid, thus indicating that the operation is normal. An electrical mechanism, not shown, will also close the circuit which includes the electric motors operating the machine.

It should be understood that the member 21 as well as the electrical mechanism mentioned above are duplicated on each of the idle pulleys in the equipment.

The breaking of the line 1 of sachets will release the idle pulley supported by the broken section comprised between the two adjacent driving pulleys 9 and which, by means of the teeth 10 thereof, will support the upper ends of the broken section.

The idle pulley 16 will cease to be supported by the sachet line and will fall under the action of spring 19 and gravity, until the shaft 17 reaches the lower end of the slide 18.

Simultaneously with the above, the electrical mechanism will open the circuit for the electrical drive motors and the signal member 21 will be submerged to the position 21', indicating the location of the failure. The signal member 21 may also be a luminous signal actuated by an electrical mechanism which will operate when the idle pulley 16 assumes the position 16' indicated in dash-lines in FIG. 4.

Due to the nature of the plastic material of the line of sachets, the sealing together of the broken ends may be easily effected by means of heated tongs suitable for the purpose.

It is evident that in carrying the invention into practice, many changes and/or modifications will occur to those skilled in the art without departing from the scope of the invention as clearly set forth in the appended claims.

What is claimed is:

1. A process for pasteurizing liquid products, said process comprising forming a succession of sachets of flexible sheet material in an uninterrupted line, each sachet having a sealed chamber containing liquid product to be pasteurized in an amount only partially filling the chamber, passing the line of sachets along an undulating path of travel in successive treatment zones by exerting traction on the line of sachets, and circulating a treatment liquid in said zones to cause the liquid product in the sachets to be heated and undergo pasteurization treatment as the sachets pass through said zones.

2. A process as claimed in claim 1 wherein the treatment liquid is circulated in a direction opposite the direction of travel of the line of sachets.

3. A process as claimed in claim 1 wherein said line of sachets is advanced along its path of travel in taut condition.

4. A process as claimed in claim 3 comprising signaling a break in the line of sachets by sensing a drop in the tension in the line of sachets.

5. A process as claimed in claim 3 comprising utilizing the tension in the line of sachets to support reversing rollers at the bottom of each loop of the undulating path.

6. A process as claimed in claim 5 comprising signaling a break in the line of sachets by sensing the elimination of the tension in the line of sachets at the point of the break.

7. A process as claimed in claim 1 wherein the line of sachets is advanced along its path of travel by engagement of the line of sachets at the marginal edges thereof.

8. A process as claimed in claim 1 wherein the sheet material is continuous throughout the line of sachets.

9. A process as claimed in claim 1 wherein each sachet is formed with a pouch-like portion which is supported at each location where the line of sachets undergoes reversal in its undulating path of travel.

References Cited

UNITED STATES PATENTS

| 1,227,101 | 5/1917 | Wehmiller | 99—214 |
| 3,048,070 | 8/1962 | Groves | 99—289 |

FOREIGN PATENTS

| 350,627 | 6/1931 | Great Britain. |

OTHER REFERENCES

Wornick et al., Heat Penetration into Plastic Packages for Heat-Processed Foods. Package Engineering, July 1960, vol. 5 (pp. 33–37).

LIONEL M. SHAPIRO, Primary Examiner

D. M. NAFF, Assistant Examiner

U.S. Cl. X.R.

99—211, 214, 215; 53—25